(12) United States Patent  (10) Patent No.: US 8,503,466 B2
Harrand  (45) Date of Patent: Aug. 6, 2013

(54) NETWORK ON CHIP INPUT/OUTPUT NODES

(75) Inventor: Michel Harrand, Saint Egreve (FR)

(73) Assignee: Kalray, Orsay (FR)

( * ) Notice: Subject to any disclaimer, the term of this patent is extended or adjusted under 35 U.S.C. 154(b) by 342 days.

(21) Appl. No.: 12/870,382

(22) Filed: Aug. 27, 2010

(65) Prior Publication Data

US 2011/0058569 A1   Mar. 10, 2011

(30) Foreign Application Priority Data

Sep. 4, 2009   (FR) ........................................ 09 04209

(51) Int. Cl.
*H04L 12/28* (2006.01)
*H04L 12/56* (2006.01)

(52) U.S. Cl.
USPC ........... 370/412; 370/229; 370/235; 370/252; 370/253; 370/417; 370/418; 370/419; 370/425

(58) Field of Classification Search
USPC ................. 370/229–235, 236, 247, 252, 253, 370/257, 412, 417–419, 425
See application file for complete search history.

(56) References Cited

U.S. PATENT DOCUMENTS

| 4,942,517 A | * | 7/1990 | Cok ................................. 712/11 |
| 5,689,647 A | | 11/1997 | Miura |
| 5,701,434 A | * | 12/1997 | Nakagawa ..................... 711/157 |
| 6,680,915 B1 | * | 1/2004 | Park et al. ..................... 370/254 |
| 2007/0140280 A1 | | 6/2007 | Rhim et al. |
| 2011/0058569 A1 | * | 3/2011 | Harrand ........................ 370/412 |

FOREIGN PATENT DOCUMENTS

| EP | 1 701 274 B1 | 2/2008 |
| WO | WO 89/03564 A1 | 4/1989 |

* cited by examiner

*Primary Examiner* — Michael Thier
*Assistant Examiner* — Benjamin H Elliott, IV
(74) *Attorney, Agent, or Firm* — Oliff & Berridge, PLC

(57) ABSTRACT

The present invention relates to a torus network comprising a matrix of infrastructure routers, each of which is connected to two other routers belonging to the same row and to two other routers belonging to the same column; and input/output routers, each of which is connected by two internal inputs to two other routers belonging either to the same row, or to the same column, and comprising an external input for supplying the network with data. Each input/output router is devoid of queues for its internal inputs and comprises queues assigned to its external input managed by an arbiter which is configured to also manage the queues of an infrastructure router connected to the input/output router.

4 Claims, 3 Drawing Sheets

NETWORK ON CHIP INPUT/OUTPUT NODES

BACKGROUND OF THE INVENTION

The invention relates to a Network on Chip (or NoC) topology, and more particularly to an arrangement of input/output nodes in a meshed network.

STATE OF THE ART

FIG. 1 represents an example of a matrix (or meshed) NoC topology as described in European Patent EP1701274.

This network comprises a plurality of busses arranged in rows (horizontal busses Bh) and columns (vertical busses Bv). A router RTR is placed at each intersection between a horizontal bus and a vertical bus to make a point-to-point connection between each bus segment (horizontal and vertical) that reaches it. Each router RTR is further connected to a local resource RSC which can be a data producer or consumer.

This kind of network is designed to make any resource RSC communicate with any other resource. A communication can cross several routers which are in charge of routing of the data to the final destination.

To limit the number of nodes a communication can cross, the network is preferably toroidal. As shown, the routers located on an edge of the matrix are connected to the routers located at the opposite edge of the matrix. This further enables the same router structure to be used both at the edges and in the centre of the matrix.

FIG. 2 schematically represents a router usable in this context. The router manages five channels, i.e. the four directions corresponding to the bus segments, namely North (N), South (S), East (E) and West (W), and a link L corresponding to the local resource.

A four-input multiplexer MX is associated with each router output direction. These four inputs correspond to the router inputs that are not associated with the direction of the multiplexer. For example North output multiplexer MXN receives router inputs L, S, E and W. In other words the router prevents a packet input via one direction from exiting via the same direction.

Each multiplexer input is further preceded by a FIFO queue 20 intended to store the awaiting output data.

A controller 22 performs arbitration and controls the selections made by the multiplexers and the writing into queues 20 of the data entering via the five channels.

One envisaged application of a network of the type of FIG. 1 is parallel computing. In this case, each resource RSC is a cluster of processors. Such a network is then associated with input/output peripherals enabling at least the provision of data for the computations and the extraction of the results of the computations.

An immediate solution is to use some of the resources RSC to perform the required input/output operations, preferably resources located at the edge of the matrix to facilitate connection with contact pads for linking the chip to the outside world.

This solution, for a same matrix size, penalizes the NoC's computing power. A certain number of processor clusters are replaced by input/output units which have much lower computing requirements than what a processor cluster can provide, but the specificity of which, in particular the fact of having connections with the outside world, entails that their functions cannot be fulfilled by a processor cluster, even in shared time.

Thus, if the matrix is sized to offer a given computing power, the input/output units will have to be added around the network. Depending on the choices made by the designer, this addition may significantly increase the latency of the network and/or pointlessly increase the surface area of the chip.

One solution that can be envisaged for adding input/output units to a given matrix consists in adding two columns and two rows of routers at the periphery of the matrix and in connecting the input/output units thereto. The router matrix size then increases from n×n to (n+2)×(n+2), which likely increases the number of nodes crossed by communications, thereby increasing the latency of the network.

Another solution could consist in using six-channel peripheral routers, the sixth channel serving the purpose of connecting an input/output unit. This solution, described for example in patent application WO89/03564, has the drawback that the peripheral routers will have a larger surface area than the internal routers, which causes place-and-route problems of the routers. For design simplification reasons, it is preferable that all routers be identical, thus all having six channels. In this case the internal routers will have unused functions which will occupy unnecessary surface area.

For indicative purposes, a six-channel router, compared with a router of FIG. 2, would comprise one more multiplexer, and each multiplexer would have five inputs with their corresponding FIFO memories.

FIG. 3 illustrates a solution addressing these drawbacks, as proposed in U.S. Pat. No. 5,689,647. It shows a torus network as that of FIG. 1. Three-channel routers IOR, which will be qualified as "input/output routers", have been inserted at the periphery of the matrix. Two of the channels of each of these routers IOR, which will be qualified as internal, serve the purpose of ensuring the continuity of the row or column in which the router is located. The third channel, which will be qualified as external, serves the purpose of inserting and extracting data from the network by an input/output unit IOM.

Unlike internal routers RTR which will be called "infrastructure routers", routers IOR located in the rows are not connected to routers of the same column. Likewise, routers IOR located in the columns are not connected to routers of the same row.

Assuming that the initial matrix has a dimension of n×n, adding routers IOR according to FIG. 3 increases the size of the matrix to (n+2)×(n+2). Thus, the network of FIG. 3 is likely to have a greater latency than the network of FIG. 1.

SUMMARY OF THE INVENTION

It is therefore desirable, in a NoC with processor clusters, to add input/output units without substantially increasing the latency of the network or unnecessarily increasing the chip surface area.

To tend this need, a torus meshed network is provided, comprising a matrix of infrastructure routers each of which is connected to two other routers belonging to the same row and to two other routers belonging to the same column; and input/output routers each of which is connected by two internal inputs to two other routers belonging either to the same row, or to the same column, and comprising an external input for supplying the network with data. Each input/output router is devoid of queues for its internal inputs and comprises queues assigned to its external input managed by an arbiter which is configured to also manage the queues of an infrastructure router connected to the input/output router.

According to an embodiment, the arbiter is configured to manage the input/output router's queues in combination with the infrastructure router's queues such that the combination of the two routers behaves like a six-channel router.

BRIEF DESCRIPTION OF THE DRAWINGS

Other advantages and features will become more clearly apparent from the following description of exemplary embodiments, illustrated by means of the accompanying drawings, in which.

DESCRIPTION OF A PREFERRED EMBODIMENT OF THE INVENTION

Figure 1:
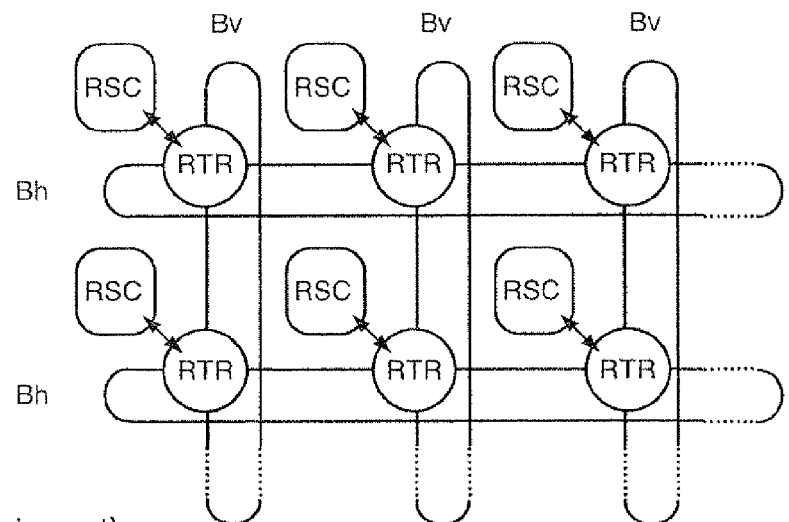
FIG. 1 schematically represents a conventional torus network on chip.
Figure 2:
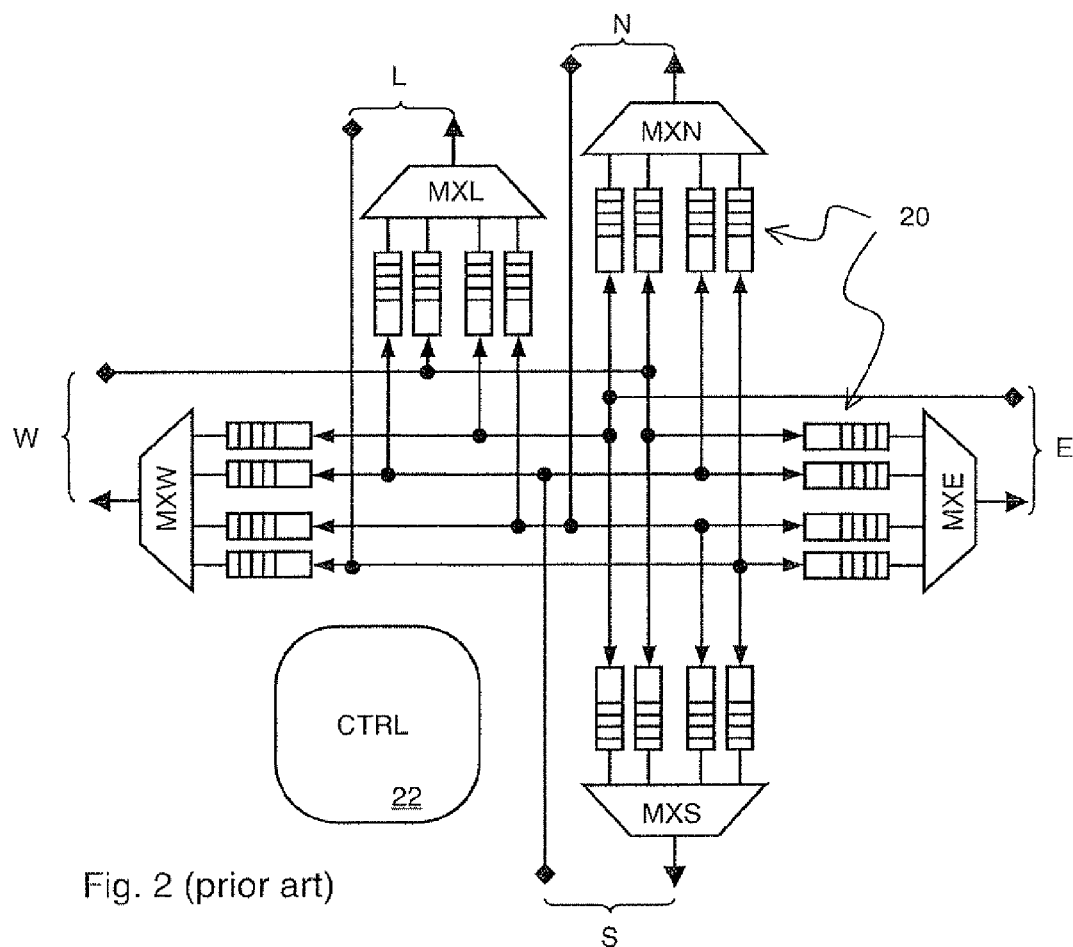
FIG. 2 schematically represents the structure of a router of the network of FIG. 1.
Figure 3:
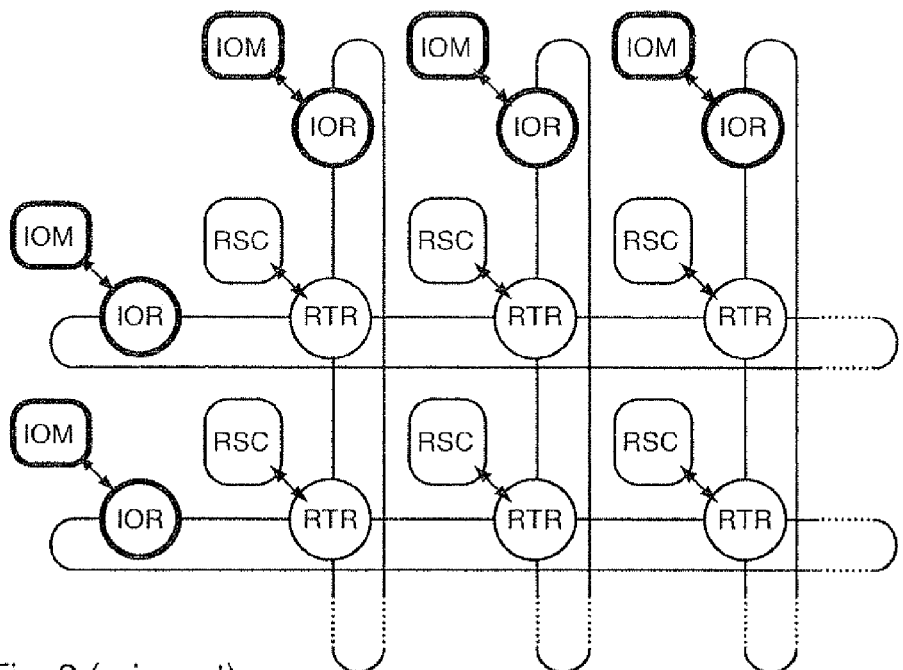
FIG. 3 schematically represents an embodiment of a torus network having input/output routers.
Figure 4:
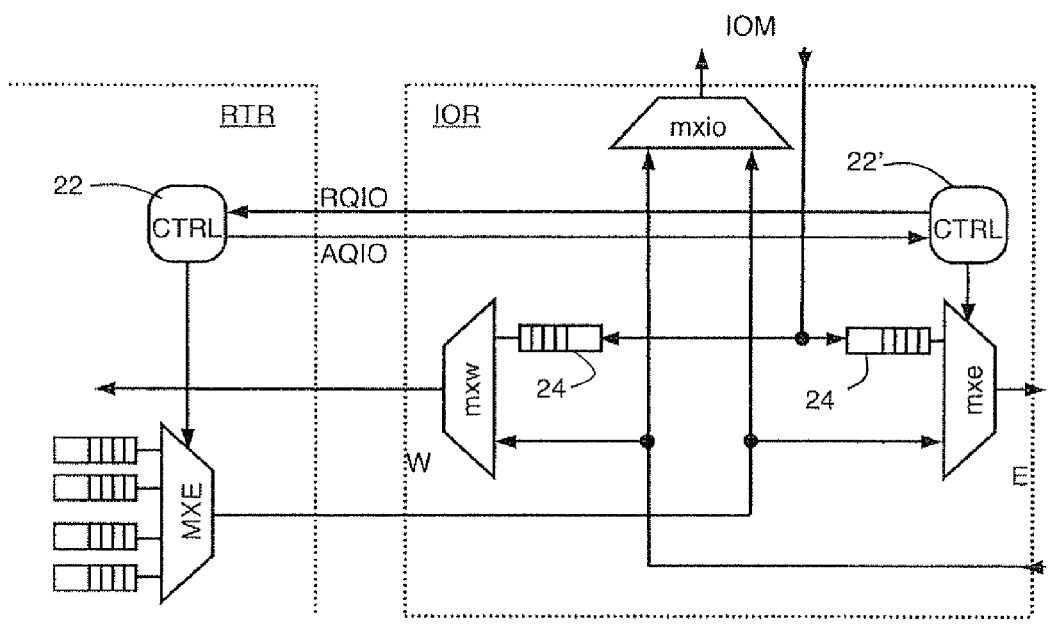
FIG. 4 represents an embodiment of routers.

FIG. 4 schematically represents a combined embodiment of an input/output router IOR and infrastructure router RTR ensuring that the input/output routers IOR of FIG. 3 do not introduce latency. Part of an East infrastructure router RTR has been represented, in particular its multiplexer MXE and control circuit 22, connected to an input/output router IOR represented in full.

Router IOR being a three-channel router, it comprises three two-input multiplexers. A West multiplexer mxw receives, on a first input, data coming from input/output unit IOM and, on a second input, data coming from a router to the East, not shown. An East multiplexer mxe receives, on a first input, data coming from input/output unit IOM and, on a second input, data corning from East multiplexer MXE of the shown router RTR.

The data from input/output unit IOM arrive on the corresponding inputs of multiplexers mxw and mxe via FIFO queues 24.

However, as shown, all the other inputs of the multiplexers of router IOR are devoid of FIFO queues. In this manner, data crossing router IOR does not undergo any latency.

The following description of the cooperation between a router RTR and a router IOR is made referring to the elements represented in FIG. 4, i.e. a link between a router IOR and a router RTR to its West. The operation is similar for the other possible combinations in a network.

In order to ensure that no data is lost due to the absence of FIFO queues for crossing router IOR, the control circuits CTRL of routers IOR and RTR interact in such a way that the shown combination of multiplexers MXE and mxe behaves as a single multiplexer having five channels provided with FIFO queues. These five channels are formed by the four inputs of multiplexer MXE and the input of multiplexer mxe assigned to unit IOM. In other words, the combination of the input/output router and of the infrastructure router behaves as a six-channel router.

When unit IOM has no data to supply on the East output of router IOR, multiplexer mxe is positioned to select the output of multiplexer MXE of router RTR. Multiplexer MXE is controlled in a conventional manner and the data it supplies is transmitted directly, without latency, to the East output of router IOR.

When unit IOM starts to supply data, the data is stacked in queue 24 of multiplexer mxe. Control circuit 22' of router IOR then enables a request signal RQIO to the attention of control circuit 22 of router RTR. The latter then switches to a mode for arbitration between five channels instead of four, the fifth channel being the one assigned to queue 24 of multiplexer mxe.

When the arbiter decides to serve the fifth channel, the control circuit of router RTR enables an acknowledge signal AQIO for the control circuit of router IOR. The latter positions multiplexer mxe to output a data unit, for example a packet, from queue 24.

As long as queue 24 contains data, signal RQIO remains active and the control circuit of router RTR remains in a mode for arbitration between five channels. Signal AQIO is activated packet by packet, each time the arbiter decides to serve the fifth channel.

In principle, only the infrastructure routers RTR that are connected to input/output routers IOR need to implement the mechanism that has just been described. Nevertheless, since this mechanism involves logic that occupies a negligible surface area, this logic may be provided in all the infrastructure routers, so that all these routers are identical. Network design is thereby simplified. The routers that do not use the functionality will have their input associated with signal RQIO wired to an inactive logic level.

In a torus network as shown in FIG. 3, two IOR routers are consecutive in the links between the edges of the matrix. These IOR routers should therefore relay signals RQIO and AQIO to one another. Nevertheless, FIG. 3 corresponds to a simplified representation for the sake of clarity. In practice, it is desirable to avoid links that are as long as those which would connect the edges of the matrix.

Figure 5:
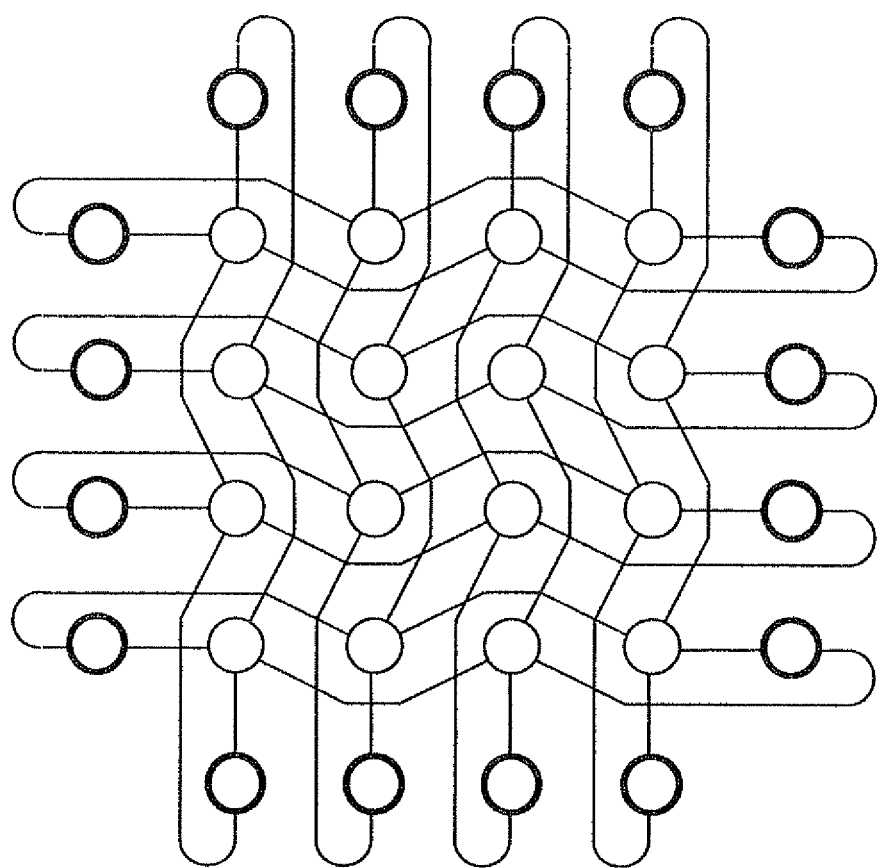
FIG. 5 schematically represents an optimization of the network of FIG. 3.

FIG. 5 represents a torus network in which the link lengths between nodes are optimized. The matrix size is 4×4 for example. The infrastructure routers are shown in thin lines and the input/output routers are shown in bold lines.

The infrastructure routers are interleaved by rows and by columns, i.e. a router of rank n in a column or a row is connected to a router of rank n+2 (the peripheral routers not abiding by this rule for one of their links). The input/output routers are inserted in the links exiting from the peripheral infrastructure routers.

With this configuration, all the links between the routers are of substantially the same length and each input/output router is located between two infrastructure routers.

The invention claimed is:

1. A torus network comprising:
a plurality of resources arranged in a matrix;
an input/output port;
an infrastructure router assigned to each resource, the infrastructure router comprising:
five bidirectional channels connected respectively to two other I infrastructure routers in a same row, two other infrastructure routers in a same column, and the resource; and
a queue coupling each incoming link of the five channels to each outgoing link of the four other channels;
an input/output router connected between two infrastructure routers in a same row or column, the input/output router comprising:
three bidirectional channels connected respectively to the two infrastructure routers and the input/output port; and
a queue coupling the incoming link of the input/output port to each outgoing link of the channels connected to the two infrastructure routers, wherein the incoming links of the channels connected to the two infrastructure routers are coupled without queues to the outgoing links of the three bidirectional channels; and an arbiter configured to prioritize the queue of each outgoing link of the input/output router together with prioritizing the queues of an outgoing link of same direction of a corresponding one of the two infrastructure routers connected to the input/output router.

2. The torus network according to claim 1, wherein the arbiter is configured to prioritize the queues of the input/output router and the corresponding infrastructure router so that the combination of the input/output router and the corresponding infrastructure router behaves as a six-channel router.

3. The torus network according to claim 1, wherein each input/output router comprises a multiplexer with two inputs, a first input of which receives data from one of said queues of the input/output router, and a second input of which receives data directly from an infrastructure router.

4. The torus network according to claim 1, wherein the arbiter comprises:
  a first control circuit in the input/output router configured to produce a request signal when data arrives in one of the queues of the input/output router and to cause transmission of the data upon receiving an acknowledgement signal; and
  a second control circuit in the corresponding infrastructure router configured to manage priorities among the queues of the infrastructure router and, upon receiving the request signal, including the queue of the input/output router in the priority management, and producing the acknowledgement signal when the second control circuit determines that the queue of the input/output router has priority.

* * * * *